(12) United States Patent
Somani et al.

(10) Patent No.: US 10,584,989 B2
(45) Date of Patent: Mar. 10, 2020

(54) VAPOR ON DEMAND SYSTEMS AND METHODS

(71) Applicants: Bhushan Somani, Yorba Linda, CA (US); Geoffrey Rodney Wong, Belmont, CA (US)

(72) Inventors: Bhushan Somani, Yorba Linda, CA (US); Geoffrey Rodney Wong, Belmont, CA (US)

(*) Notice: Subject to any disclaimer, the term of this patent is extended or adjusted under 35 U.S.C. 154(b) by 321 days.

(21) Appl. No.: 15/424,719

(22) Filed: Feb. 3, 2017

(65) Prior Publication Data

US 2017/0219393 A1 Aug. 3, 2017

Related U.S. Application Data

(60) Provisional application No. 62/290,556, filed on Feb. 3, 2016.

(51) Int. Cl.
  *G01F 1/00* (2006.01)
  *G01F 25/00* (2006.01)
  *G01F 9/00* (2006.01)

(52) U.S. Cl.
  CPC ............ *G01F 1/007* (2013.01); *G01F 9/003* (2013.01); *G01F 25/0046* (2013.01); *G01F 25/0092* (2013.01)

(58) Field of Classification Search
  CPC .......... G01F 1/007; G01F 9/003; G01F 9/005; G01F 25/0007; G01F 25/0038; G01F 25/0046; G01F 13/006; G01F 25/0092; F22B 37/78
  See application file for complete search history.

(56) References Cited

U.S. PATENT DOCUMENTS

| | | | |
|---|---|---|---|
| 6,722,214 B1* | 4/2004 | Cole | B04B 5/0421 159/25.1 |
| 7,392,698 B2* | 7/2008 | Zalite | G01F 25/0007 73/220 |
| 7,680,399 B2* | 3/2010 | Buchanan | F22B 35/00 392/386 |
| 2013/0174913 A1* | 7/2013 | Dinnage | F28F 25/02 137/2 |
| 2017/0016755 A1* | 1/2017 | Boussange | G01F 25/0038 |

* cited by examiner

*Primary Examiner* — Justin N Olamit
(74) *Attorney, Agent, or Firm* — Mahesh Law Group PC; Kumar Maheshwari

(57) ABSTRACT

A system and method including a weighing scale configured to measure a starting weight at a start time of a vaporizer chamber with a vaporizable liquid, the weighing scale configured to measure an ending weight at an end time and a controller configured to determine a vapor flow rate out of the vaporizer chamber based on a difference between the start time and the end time.

17 Claims, 6 Drawing Sheets

VAPOR ON DEMAND SYSTEMS AND METHODS

CROSS REFERENCE TO RELATED APPLICATIONS

The present application claims the benefit of and priority to U.S. Provisional Patent Application No. 62/290,556, filed on Feb. 3, 2016 and entitled "Vapor on Demand Systems and Methods", which is herein incorporated by reference in its entirety.

FIELD

The embodiments disclosed below relate generally to the field of vapor on demand systems and methods. More specifically, the embodiments relate to systems and methods for verifying the performance of a mass flow controller (MFC) using vapor on demand systems and methods.

BACKGROUND

Various industrial or semiconductor processing require vapor of various liquids. Semiconductor processing may require vapors or liquids, such as, but not limited to, photoresist chemicals, water, SiC14, TOS, TiC14, and GeC14 in vapor form. A MFC must deliver accurate amounts the vapor or liquids to the semiconductor processing chamber with precise timing and volume. Accordingly, verification and validation of the MFC's ability to delivery liquids or vapors is advantageous to industrial and semiconductor processing.

SUMMARY

A first embodiment relates to a system and method including a weighing scale configured to measure a starting weight at a start time of a vaporizer chamber with a vaporizable liquid, the weighing scale configured to measure an ending weight at an end time and a controller configured to determine a vapor flow rate out of the vaporizer chamber based on a difference between the start time and the end time.

A second embodiment relates to a system including a vaporizable liquid which is released in vapor form by a mass flow controller and the controller is configured to determine the vapor flow rate based on the difference between the starting weight and the ending weight.

A third embodiment relates to a system including a controller which comprises of a force transmitter sensor, capable of transmitting a force exerted by the vaporizer chamber with the vaporizable liquid, to the controller. The force transmitter sensor is a weighing scale or a strain gauge.

A fourth embodiment relates to a system, including a sensor configured to measure a starting liquid level at a start time in a vaporizer chamber with a vaporizable liquid, the sensor configured to measure an ending liquid level at an end time, a controller configured to determine a vapor flow rate out of the vaporization chamber based on a difference between staring liquid level and the ending liquid level. Also, the starting time and the ending time could be predetermined based on the type of liquid.

A fifth embodiment relates to a system including a capacitive probe having one or more conductive plates as the sensor. The capacitive probe measures a difference in capacitance at a start time and an end time.

A sixth embodiment relates to a system including a magnetic sensor. The magnetic sensor measures a difference in voltage or current at a start time and an end time.

A seventh embodiment relates to a system including a radar sensor. The radar sensor measures a difference in distance at a start time and an end time.

A eighth embodiment relates to a system including an ultrasonic sensor. The ultrasonic sensor measures a difference in distance at a start time and an end time.

A ninth embodiment relates to a system including a differential pressure measurement sensor. The differential pressure measurement sensor measures a difference in pressure at a start time and an end time.

A tenth embodiment relates to a method including, measuring a first value of a physical parameter of a vaporizable liquid in a vapor chamber using a sensor at a start time, measuring a second value of the physical parameter of the vaporizable liquid in the vapor chamber using the sensor at an end time, determining a vapor flow rate out of the vaporizer chamber based on the difference between the first value and the second value of the physical parameter of the vaporizable liquid. The physical parameter is a weight of the vaporizable liquid in the vapor chamber. The physical parameter could also be a height of the vaporizable liquid in the vapor chamber. The physical parameter could also be a volume of the vaporizable liquid in the vapor chamber. The sensor could be a weighing scale or the sensor is any of a force transmitter sensor, a capacitive probe sensor, a magnetic sensor, a radar sensor, an ultrasonic sensor or a differential pressure measuring sensor.

DETAILED DESCRIPTION

Embodiments may be implemented using a controller that controls a vapor on demand system. Embodiments include a multifunctional software implemented on a hardware device (non-transitory computer storage media) that employs advanced user interface such as gestures, iris and voice input, to perform actions and interact with users.

Embodiments include a vaporizer chamber having an outlet connected to a MFC, the vaporizer chamber is configured to receive heat from an external or internal heat source and a weighing scale configured to measure the weight of the vaporizer chamber with a starting amount of liquid. The MFC may be configured to operate in a verification mode where a starting amount of liquid is vaporized by the heat source at a temperature below the boiling point of the liquid. The MFC is configured to deliver the vapor that is generated by the vaporizing chamber and the MFC calculates the speed at which it is delivering the vapor. By subtracting the start weight of the vaporizing chamber with the end weight of the vaporizing chamber the vapor delivery rate may be independently calculated over a period of time. Accordingly, the MFC vapor delivery rate may be compared with the independently calculated gravimetrically measured vapor delivery to determine whether the MFC is operational with specified parameters.

Other embodiments include determining the change in the level of the liquid by using an ultrasonic sensor or measuring the distance between the top of the vaporizing chamber and the distance of the liquid and the rate of change of the height of the liquid in the chamber. Rate of change of the liquid may allow a user to compare an independently measured vapor delivery compared to the vapor delivery rate by the MFC.

Figure 1:
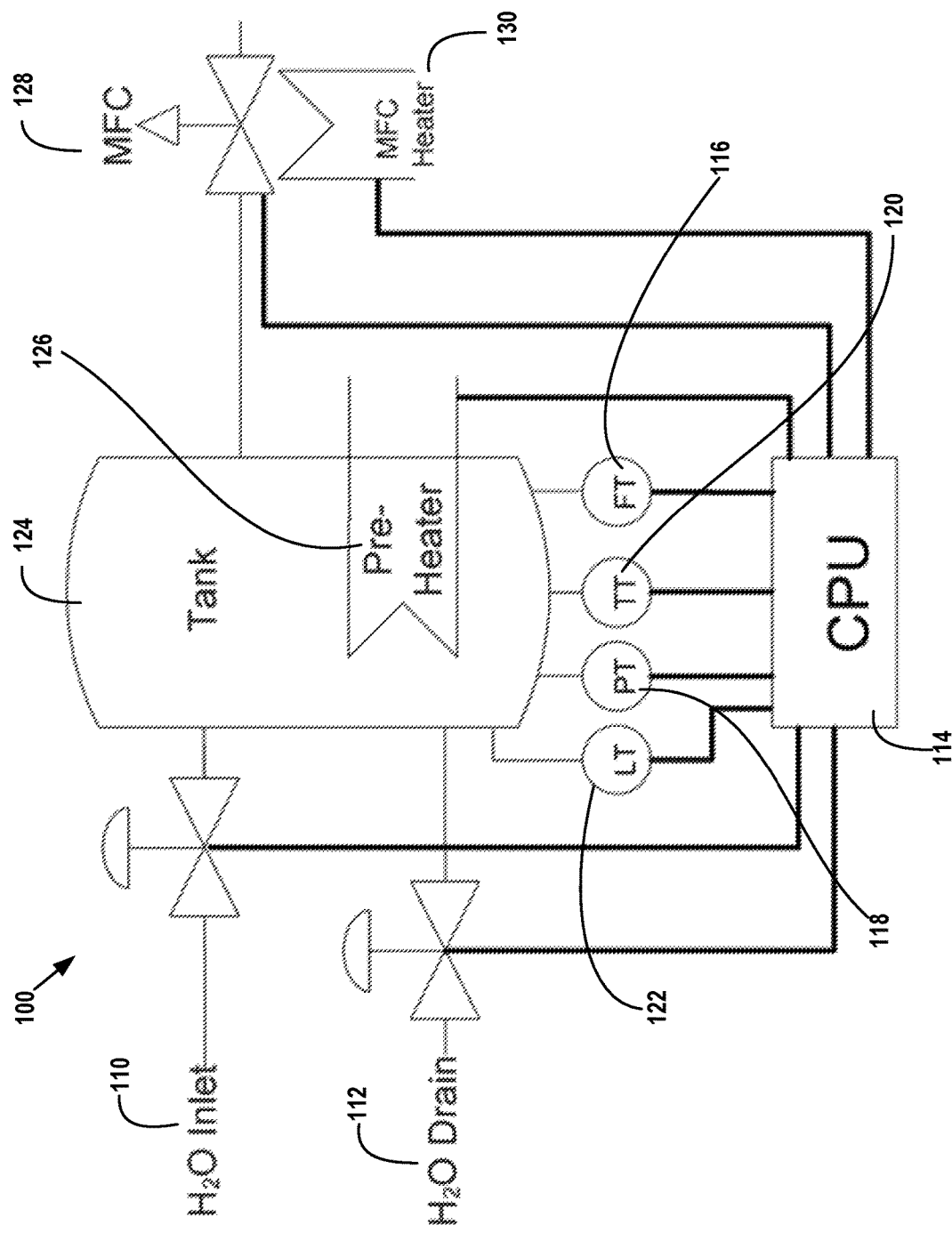
FIG. 1 is an overview of a mass flow controller according to an example embodiment.

Referring to FIG. 1, FIG. 1 illustrates a vapor on demand system 100 that includes an inlet valve 110, a drain 112, a central processing unit (CPU) 114, force transmitter (FT) sensor 116, differential pressure (PT) sensor 118, temperature sensor (TT) 120, level sensor (LT) 122, vaporizer tank 124 with a pre-heater 126, a MFC 128 and a MFC heater 130.

The vaporizer tank 124 may be filed with a fixed volume of liquid (for example, water, or other liquids) that may be heated using the pre-heater 126 to a temperature below the boiling point, but sufficient to vaporize the liquid. In order to determine the rate at which the MFC 128 dispenses the vapor from the liquid, the reduction in weight of the vaporizer tank 124 may be measured using the force transmitter 116. In various embodiments, the force transmitter 116 may be a weighting scale or strain gauge. In various embodiments, the force transmitter 116 may transmit the force (weight) exerted by the vaporizer tank 124 and the liquid (weight) and the change in force exerted by the liquid and the vaporizer tank 124 to the CPU 114 for processing. By determining the amount of time and the relative reduction in weight, the CPU 114 can determine the rate at which the vapor was dispensed by the MFC 128 in a verification mode (where no additional liquid is added by the liquid or water inlet valve). In some embodiments, using the weight of the liquid or the rate of the change in the weight of the liquid may be considered a gravimetric verification of the vapor on demand system 100. The inlet valve 110 must be closed and the flow of the MFC 128 via a feedback signal over time monitored for comparison.

Figure 2:
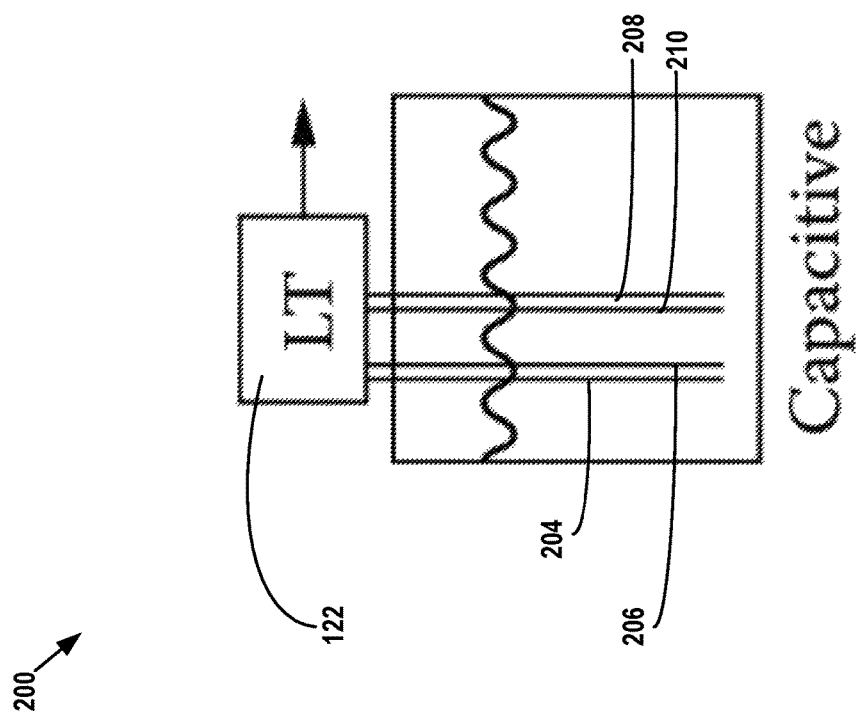
FIG. 2 is a schematic diagram of a gravimetric or capacitive verification vapor on demand system.

FIG. 2 is a schematic diagram of a gravimetric or capacitive verification vapor on demand system 200. In the embodiment that includes the gravimetric verification of the vapor on demand system, the force transmitter 116 may include a load cell with a strain gauge, a force transmitter and a beam. For example, the beam may have a resistor that changes the resistance of the beam based on the amount of strain on the beam. The change in the strain may be transmitted to the CPU 114 using the force transmitter 116.

FIG. 2 illustrates a tank 202 with liquid and two capacitive liquid level measuring devices 204 and 206. The capacitive liquid level measuring device may use two conductive plates 208 and 210 to determine the level of the liquid over a period of time. In some embodiments, two or more plates or tubes or wires may be used to calculate the level of capacitance. The capacitance level may be determined based on the amount of liquid that has vaporized over a period of time. The capacitance at the beginning the pre-heat cycle is measured and the capacitance at the end of the pre-heat cycle is measured. In various embodiments, the capacitance may increase because there is less liquid in the tank. Due to the dielectric constant difference between air and water, a probe would measure variable capacitance depending on how much of the probe length is submerged. A capacitive probe may be able to determine the level of the liquid in the vaporizer tank 124.

Figure 3:
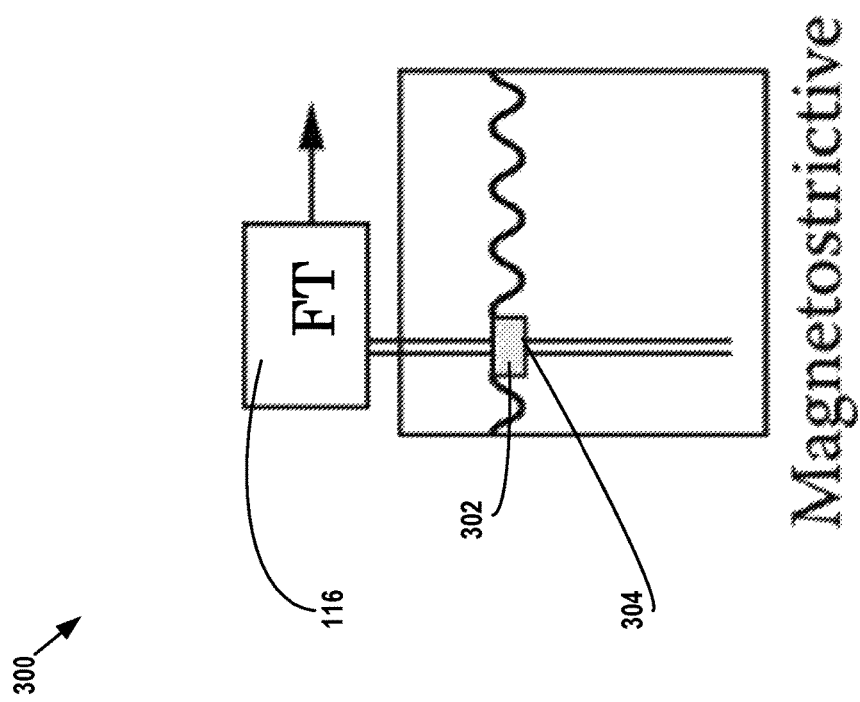
FIG. 3 is a schematic diagram of a magnetorisistive verification vapor on demand system.

FIG. 3 is a schematic diagram of a magnetoresistive verification vapor on demand system 300. In a magnetoresistive verification system 300 a float 302 rides on the liquid level and a permanent magnet 304 is located inside float 302. A magnetic force measuring sensor at the top of the vaporizer tank 124 is configured to determine the level of the liquid from a beginning to an end of the time period to an end of the time period. Measuring the level of the liquid may allow the CPU 114 to calculate the amount of vapor that was dispensed by the MFC 128. A float 302 rides on the liquid level and a permanent magnet 304 is located inside float. A magnetic sensor may be able to determine the distance between the magnet 304 and the top of the tank by the voltage or current generated by the sensor changing based on the proximity to the magnet 304.

Figure 4:
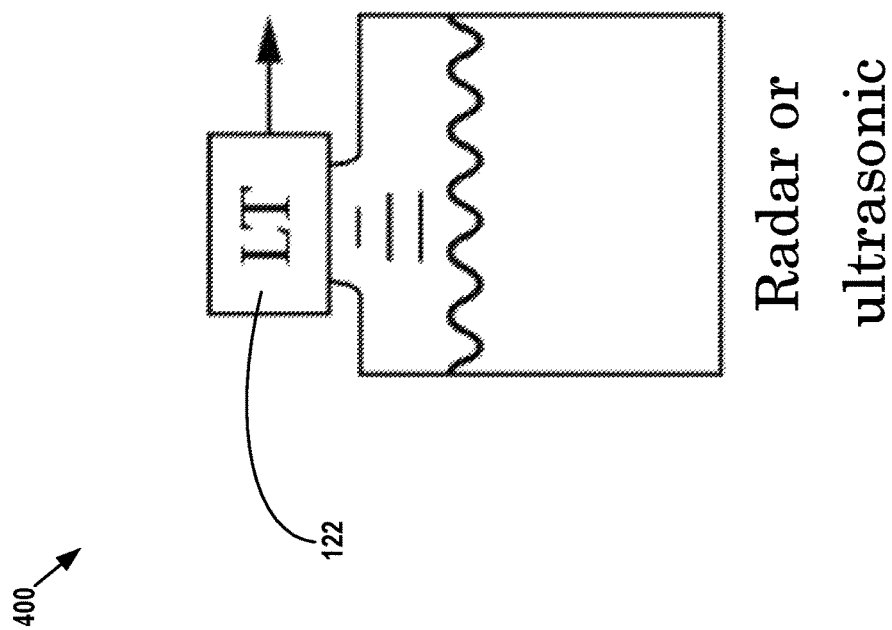
FIG. 4 is a schematic diagram of a radar or ultrasound vapor on demand system.

FIG. 4 is a schematic diagram of a radar or ultrasonic vapor on demand system 400. The schematic in FIG. 4 illustrates a radar or ultrasonic liquid level measurement system 400 where a signal is emitted at the liquid to measure the level of the liquid for a period of time to determine the rate of vapor being dispensed by the MFC 128. Various different types of signals may be used to determine the level of the liquid and the change volume of the liquid. Ultrasonic/radar may send a RF signal from the top of the tank 124 in the direction of the liquid to determine the distance between the top of the tank 124 to the height of the liquid. After determining the height of the liquid, a volume of the liquid may be calculated based on the known dimensions of the tank.

Figure 5:
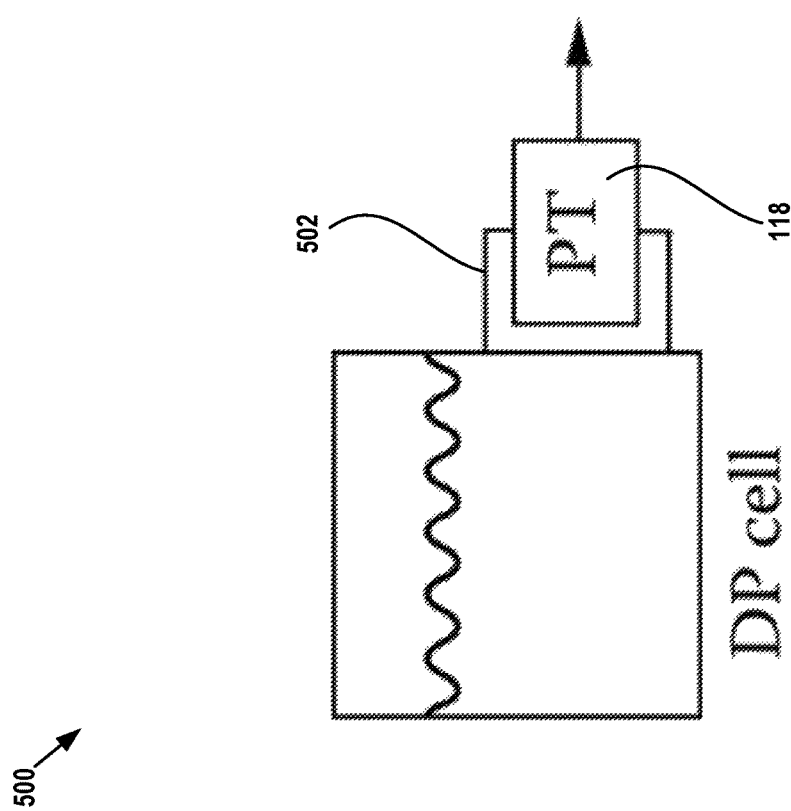
FIG. 5 is a system diagram of a pressure verification vapor on demand system.

FIG. 5 is a schematic of a level verification vapor on demand system 500. The level verification vapor system 500 illustrates a differential pressure measurement. Pressure taps 502 may be used to determine the elevation of the liquid. The level of the liquid may be used to determine the volume of the liquid within the vaporizer tank at the beginning and the volume of the liquid within the vaporizer tank at the end of the time period.

The inventive subject matter describes a system and method including a weighing scale configured to measure a starting weight at a start time of a vaporizer chamber with a vaporizable liquid, the weighing scale configured to measure an ending weight at an end time and a controller configured to determine a vapor flow rate out of the vaporizer chamber based on a difference between the start time and the end time.

The inventive subject matter describes a system including a vaporizable liquid which is released in vapor form by a mass flow controller and the controller is configured to determine the vapor flow rate based on the difference between the starting weight and the ending weight.

The inventive subject matter describes a system including a controller which comprises of a force transmitter sensor, capable of transmitting a force exerted by the vaporizer chamber with the vaporizable liquid, to the controller. The force transmitter sensor is a weighing scale or a strain gauge.

The inventive subject matter describes a system, including a sensor configured to measure a starting liquid level at a start time in a vaporizer chamber with a vaporizable liquid, the sensor configured to measure an ending liquid level at an end time, a controller configured to determine a vapor flow rate out of the vaporization chamber based on a difference between staring liquid level and the ending liquid level. Also, the starting time and the ending time could be predetermined based on the type of liquid.

The inventive subject matter describes a system including a capacitive probe having one or more conductive plates as the sensor. The capacitive probe measures a difference in capacitance at a start time and an end time.

The inventive subject matter describes a system including a magnetic sensor. The magnetic sensor measures a difference in voltage or current at a start time and an end time.

The inventive subject matter describes a system including a radar sensor. The radar sensor measures a difference in distance at a start time and an end time.

The inventive subject matter describes a system including an ultrasonic sensor. The ultrasonic sensor measures a difference in distance at a start time and an end time.

The inventive subject matter describes a system including a differential pressure measurement sensor. The differential pressure measurement sensor measures a difference in pressure at a start time and an end time.

The inventive subject matter describes a method including, measuring a first value of a physical parameter of a vaporizable liquid in a vapor chamber using a sensor at a start time, measuring a second value of the physical parameter of the vaporizable liquid in the vapor chamber using the sensor at an end time, determining a vapor flow rate out of the vaporizer chamber based on the difference between the first value and the second value of the physical parameter of the vaporizable liquid. The physical parameter is a weight of the vaporizable liquid in the vapor chamber. The physical parameter could also be a height of the vaporizable liquid in the vapor chamber. The physical parameter could also be a volume of the vaporizable liquid in the vapor chamber. The sensor could be a weighing scale or the sensor is any of a force transmitter sensor, a capacitive probe sensor, a magnetic sensor, a radar sensor, an ultrasonic sensor or a differential pressure measuring sensor.

Figure 6:
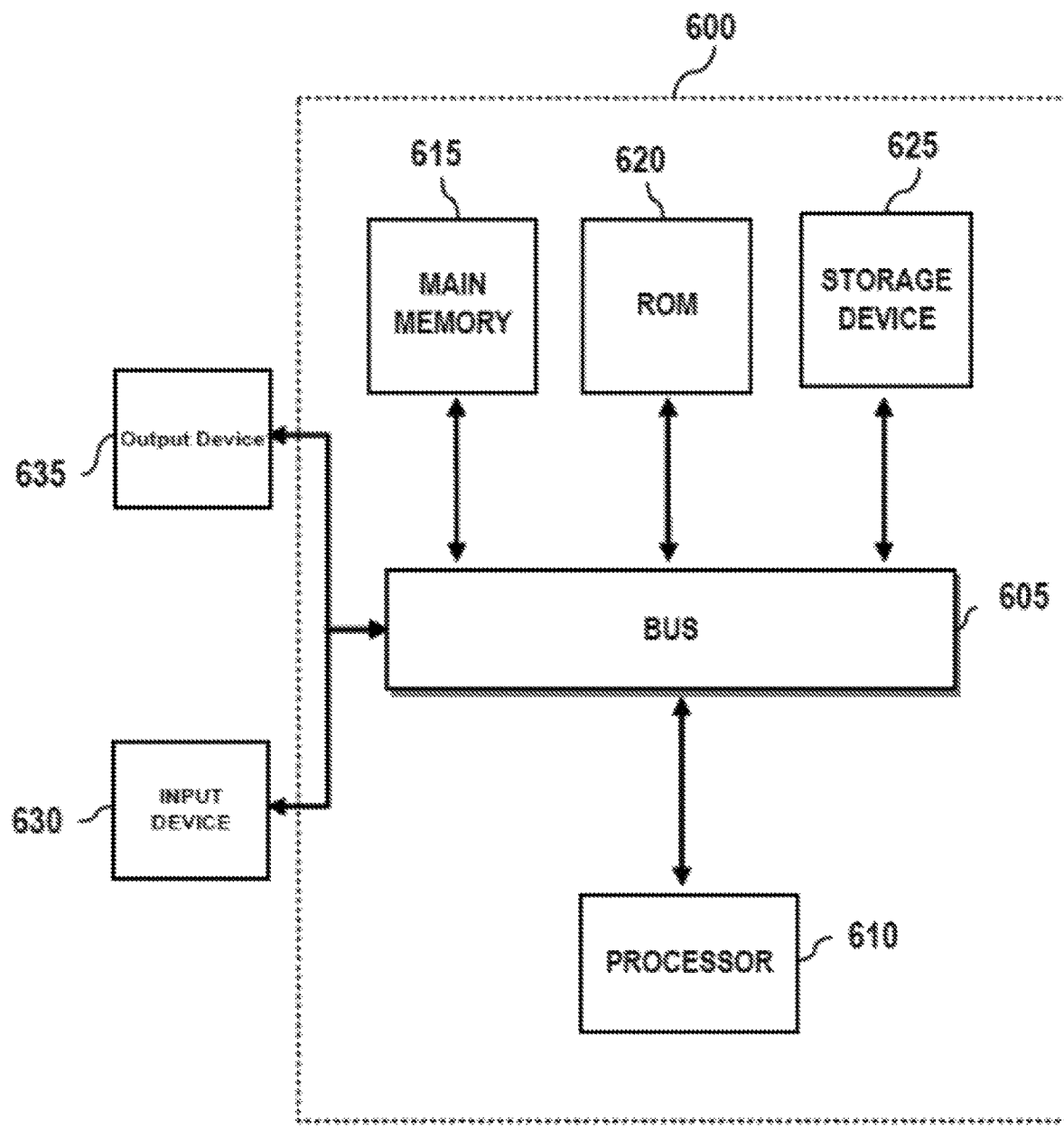
FIG. 6 illustrates a computer system that may be used to control the systems and methods described in various figures herein.

FIG. 6 illustrates a computer system that may be used to control the systems and methods described various figures herein. FIG. 6 illustrates a depiction of a computer system 600 that can be used to provide user interaction reports, process log files, receive user input audio or gesture and process the input. The computing system 600 includes a bus 605 or other communication mechanism for communicating information and a processor 610 coupled to the bus 605 for processing information. The computing system 600 also includes main memory 615, such as a random-access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 615 or other static storage device coupled to the bus 605 for storing static information and instructions for the processor 610. A storage device 625, such as a solid-state device, non-transitory storage media, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another embodiment, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various embodiments, the processes that effectuate illustrative embodiments that are described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative embodiments, hard-wired circuitry may be used in place of or in combination with software instructions to implement illustrative embodiments. Thus, embodiments are not limited to any specific combination of hardware circuitry and software.

The embodiments described herein may be used to implement various features. For example, features such as, but not limited to text read mode, research center, custom speech command acceptance, self-aware mode, and custom user interface.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or another machine with a processor. By way of example, such machine-readable media can comprise RAM, ROM EPROM EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or another machine with a processor. Combinations of the above are also included within the scope of machine readable media. Machine-executable instructions comprise, for example, instructions and data which cause a general-purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general-purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
   a sensor configured to measure a starting liquid level at a start time in a vaporizer chamber with a vaporizable liquid;
   the sensor configured to measure an ending liquid level at an end time;
   controller configured to determine a vapor flow rate out of the vaporization chamber based on a difference between staring liquid level and the ending liquid level;
   wherein the start time and the end time are predetermined based on the type of liquid.

2. The system of claim 1 wherein the sensor is a capacitive probe comprising of one or more conductive plates.

3. The system of claim 1, wherein the capacitive probe measures a difference in capacitance at the start time and the end time.

4. The system of claim 1, wherein the sensor is a magnetic sensor, capable of measuring the change in liquid level between the start time and the end time.

5. The system of claim 1, wherein the sensor is a radar sensor, capable of measuring the change in liquid level between the start time and the end time.

6. The system of claim 1, wherein the sensor is an ultrasonic sensor, capable of measuring the change in liquid level between the start time and the end time.

7. The system of claim 1, wherein the sensor is a differential pressure measurement sensor, capable of measuring the change in liquid level between the start time and the end time.

8. A method, comprising:
   measuring a first value of a physical parameter of a vaporizable liquid in a vapor chamber using a sensor at a start time;
   measuring a second value of the physical parameter of the vaporizable liquid in the vapor chamber using the sensor at an end time;
   determining a vapor flow rate out of the vaporizer chamber based on the difference between the first value and the second value of the physical parameter of the vaporizable liquid;
   wherein the start time and the end time are predetermined based on the type of liquid.

9. The method of claim 8, wherein the physical parameter is a weight of the vaporizable liquid in the vapor chamber.

10. The method of claim 8, wherein the physical parameter is a height of the vaporizable liquid in the vapor chamber.

11. The method of claim 8, wherein the physical parameter is a volume of the vaporizable liquid in the vapor chamber.

12. The method of claim 9, wherein the sensor is a weighing scale.

13. The method of claim 10, wherein the sensor is selected from a group consisting of force transmitter sensor, capacitive probe sensor, magnetic sensor, radar sensor, ultrasonic sensor and differential pressure measuring sensor.

14. A system, comprising:
   a scale configured to measure a starting weight at a start time of a vaporizer chamber with a vaporizable liquid;
   wherein the scale is configured to measure an ending weight at an end time;
   a controller configured to determine a vapor flow rate out of the vaporizer chamber based on a difference between the start time and the end time;
   wherein the vaporizable liquid is released in vapor form by a mass flow controller.

15. The system of claim 14, wherein the controller is configured to determine the vapor flow rate based on the difference between the starting weight and the ending weight.

16. The system of claim 14, wherein the controller further comprises of a force transmitter sensor, capable of transmitting a force exerted by the vaporizer chamber with the vaporizable liquid, to the controller.

17. The system of claim 16, wherein the force transmitter sensor is a strain gauge.

* * * * *